Oct. 19, 1948.  T. SOLOMON  2,451,583
PICTURE HOLDER
Filed Oct. 31, 1944
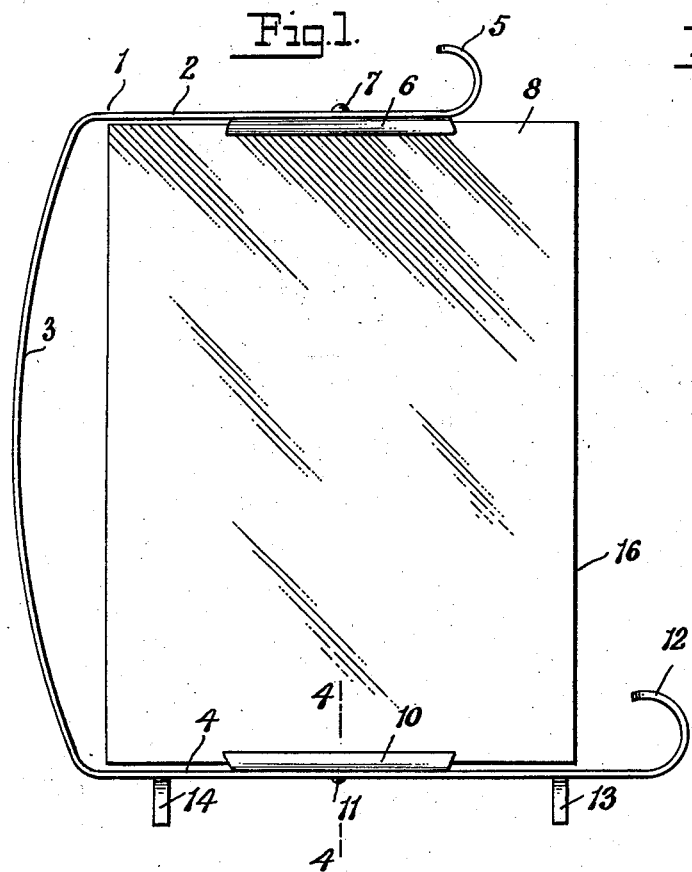
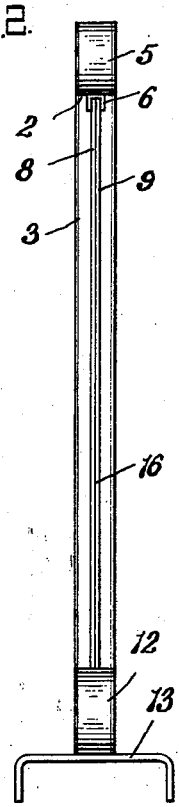
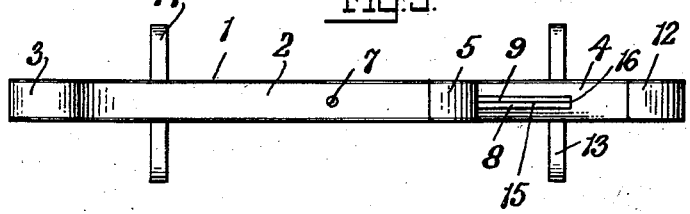
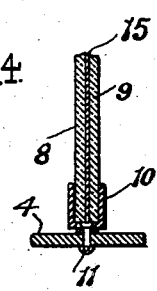
INVENTOR.
Theodore Solomon
BY
Harry Rodzinsky
Attorney "Patented Oct. 19, 1948"

2,451,583

UNITED STATES PATENT OFFICE 2,451,583

PICTURE HOLDER

Theodore Solomon, New York, N. Y.

Application October 31, 1944, Serial No. 561,175

1 Claim. (Cl. 40—152.1)

This invention relates to holders for pictures, mirrors or the like, and particularly to a supporting means or easel for such articles, wherein the picture, mirror or both, is held vertically and in such a manner that it may be rotated about a vertically disposed pivot to thereby present one or the other of two pictures held back to back, or either a mirror or a picture toward the beholder.

An object of the invention is to provide an artistic structure which is not only exceedingly useful for the performance above described, but one which will be decorative, sturdy, and of simple but lasting construction.

More particularly, the invention contemplates the provision of a spring frame, which may be described as being roughly C-shaped, and which includes a pair of arms normally resiliently urged toward one another to a limited extent and each provided with a channelled, pivoted receptacle fitting over an edge of the picture or pictures and the covering glass therefor, the springiness of the arms causing the pictures and glass to be firmly held between the arms, and the pivotal mountings for the channelled receptacles in which the pictures and covering glass is held, permitting the pictures and glass to be rotated about a vertical axis to present either of the pictures toward the viewer.

These and other objects are accomplished by the invention, a more particular description of which will appear hereinafter and be set forth in the claim appended hereto.

In the accompanying drawing, wherein an illustrative embodiment of the invention is shown, Fig. 1 is a front elevation of a holder constructed according to the invention; Fig. 2 is an end view of the same, looking from the right end of the structure of Fig. 1; Fig. 3 is a top plan view of the holder, and Fig. 4 is a sectional view on the line 4—4 of Fig. 1.

The device includes a frame 1 formed from a continuous strip of resilient material, such as metal, plastic or the like possessing sufficient resiliency to function as hereinafter described. The strip is bent to the form substantially as shown, which may be described as being roughly C-shaped. Thus, two spaced arms 2 and 4 are provided, the same being connected by the integral bowed connection piece 3. The arrangement is such that the bowed connection piece 3 tends to urge the two arms 2 and 4 toward one another to a limited extent, and to such an extent that they will tend to resiliently grip between them and securely hold a pair of panes or sheets of glass indicated at 8 and 9, between which one or more pictures 15 are sandwiched, as shown in Fig. 4. If two pictures are placed between the glasses 8 and 9, they are placed back to back. Instead of having two pictures so arranged one picture may be used and the glass at the back of it may be silvered to act as a mirror.

The glasses 8 and 9 with the pictures between them as above described, are embraced by the two arms 2 and 4 and are held between the channelled receptacles 6 and 10 provided respectively on the arms 2 and 4. These receptacles are secured on the inner faces of the arms 2 and 4 and are directed toward one another so that the upper and lower edges of the glasses 8 and 9 fit into them.

Each of the channelled receptacles is mounted on a vertical pivot pin as shown in Fig. 4. The pin for the upper receptacle is indicated at 7, while that for the lower receptacle 10 is indicated at 11. This pivotal mounting for the channelled receptacles enables the pictures and covering glasses 8 and 9 therefor to be rotated so that either of the two glasses may be presented toward the viewer. Thus, if two pictures are placed back to back between the glasses, either picture may be directed toward the viewer by rotation of the mounting, consisting of the two channelled receptacles 6 and 10 on their supporting arms.

It will be noted that the arm 4 is the lower arm and the same is longer than the upper arm since it is the base and is arranged to give stability to the structure when it is supported in the erect position shown in Fig. 1. Supporting feet 13 and 14 are provided on the lower arm 4 and these feet, which may be of the simple strap type shown or of any other ornamental form, hold the structure upright on a table or other suitable support.

It is to be noted that the free end of the lower arm 4 extends out beyond the edge 16 of the picture assembly, including the glasses 8 and 9 and said free end of the arm is curled up, as indicated at 12, to provide a measure of protection for this edge of the glasses. The free end of upper arm 2 is similarly curled as at 5 to add balance to the design.

With the holder shown, the glasses 8 and 9 and one or more pictures sandwiched between them are held firmly yet resiliently between the two spring arms 2 and 4, yet are so held that they may be quickly removed when it is desired to change or renew the pictures or replace a broken glass. The mounting is such that the picture assembly may be rotated when desired to bring one or the other of the pictures, or a picture and a mirror to display position.

While I have shown the structure in a certain design, it will be clear to those skilled in this art, that the structure may be embodied in various designs, and I therefore do not limit the invention to the design specifically shown, but consider the same to be comprehended by all structures coming within the scope of the annexed claim.

What I claim is:

A picture holder consisting of a continuous strip of substantially flat springy stock shaped to form a pair of spaced arms extending substantially parallel to one another, said arms being connected by an integral, outwardly bowed, vertically disposed part tending to normally force the arms toward one another to a limited extent and cause them to resiliently grip a picture and a glass placed between them, each of the arms being provided with a rotatively-mounted channel member for engaging an edge of the picture and glass, one of the arms being longer than the other, said longer arm having a free end extending beyond a vertically disposed edge of the picture and glass, said longer arm having its free end formed with an upwardly curled extremity to protect the edge of the picture and glass situated adjacent to said free end, said longer arm also having supporting feet for holding the device upright and with the arms located one above the other, the shorter of the two arms having a hook-shaped extremity arising above the top of the picture.

THEODORE SOLOMON.

REFERENCES CITED

The following references are of record in the file of this patent:

UNITED STATES PATENTS

| Number | Name | Date |
| --- | --- | --- |
| 128,651 | Vander Werf | Aug. 5, 1941 |
| 1,407,177 | Stone | Feb. 21, 1922 |
| 1,875,554 | Bell | Sept. 6, 1932 |
| 2,368,959 | Winslow | Feb. 6, 1945 |